US007754471B2

(12) United States Patent
Chen et al.

(10) Patent No.: US 7,754,471 B2

(45) **Date of Patent: *Jul. 13, 2010**

(54) PROCESS FOR THE HIGH RECOVERY EFFICIENCY OF SULFUR FROM AN ACID GAS STREAM

(75) Inventors: Jen Kai Chen, Katy, TX (US); Michael Arthur Huffmaster, Houston, TX (US)

(73) Assignee: Shell Oil Company, Houston, TX (US)

(*) Notice: Subject to any disclaimer, the term of this patent is extended or adjusted under 35 U.S.C. 154(b) by 959 days.

This patent is subject to a terminal disclaimer.

(21) Appl. No.: 11/070,142

(22) Filed: Mar. 2, 2005

(65) Prior Publication Data

US 2005/0214925 A1 Sep. 29, 2005

Related U.S. Application Data

(60) Provisional application No. 60/549,686, filed on Mar. 3, 2004.

(51) Int. Cl.

| | |
|---|---|
| ***A62D 3/00*** | (2007.01) |
| ***A61L 9/01*** | (2006.01) |
| ***B09B 3/00*** | (2006.01) |
| ***B09C 1/10*** | (2006.01) |
| ***C02F 3/34*** | (2006.01) |
| ***C10G 32/00*** | (2006.01) |

(52) U.S. Cl. .................... 435/266; 435/262; 435/262.5; 435/282; 435/822

(58) Field of Classification Search ....................... None
See application file for complete search history.

(56) References Cited

U.S. PATENT DOCUMENTS

| | | | | |
|---|---|---|---|---|
| 3,985,861 | A | 10/1976 | Hudson, Jr. | 423/244 |
| 4,428,921 | A | 1/1984 | Seike | 423/569 |
| 4,452,772 | A | 6/1984 | Knoblauch et al. | 423/569 |
| 4,666,852 | A * | 5/1987 | Cork | 435/262 |
| 5,266,274 | A * | 11/1993 | Taggart et al. | 422/112 |
| 5,354,545 | A | 10/1994 | Buisman | 423/242.1 |
| 5,468,458 | A | 11/1995 | Watson | 423/222 |
| 5,965,100 | A | 10/1999 | Khanmamedov | 423/576.8 |
| 6,056,934 | A * | 5/2000 | Carlsen et al. | 423/522 |
| 6,214,311 | B1 * | 4/2001 | Kwong | 423/570 |
| 6,297,189 | B1 | 10/2001 | Jin et al. | 502/218 |
| 6,432,873 | B1 | 8/2002 | Khare et al. | 502/406 |
| 6,517,801 | B2 | 2/2003 | Watson et al. | 423/574.1 |
| 6,638,057 | B2 | 10/2003 | Watson et al. | 431/174 |
| 6,656,249 | B1 | 12/2003 | Buisman et al. | 95/195 |
| 7,351,392 | B2 * | 4/2008 | Chen et al. | 423/573.1 |

FOREIGN PATENT DOCUMENTS

| | | |
|---|---|---|
| EP | 84410 | 7/1983 |
| EP | 244659 | 11/1987 |
| WO | 98/57731 | 12/1998 |
| WO | 00/10693 | 3/2000 |

OTHER PUBLICATIONS

"Jacobs Comprimo Introduces EuroClaus—the Extremely Upgraded Reduction Oxidation Claus Process," Sulphur, The British Sulphur Co., London, GB, No. 270, Sep. 2000 pp. 65-66, 68, 70, 72, XP000968266.

"Industrial Applications of New Sulphur Biotechnology," by A.J.H. Janssen et al., Water Science and Technology, Elmsford, NY, US, vol. 44, No. 8, 2001, pp. 85-90, XP009044626.

International Search Report for PCT/US2005/006687 of Jan. 30, 2006.

Written Opinion for PCT/US2005/006687 of Jan. 30, 2006.

* cited by examiner

*Primary Examiner*—David M. Naff
*Assistant Examiner*—Debbie K Ware
(74) *Attorney, Agent, or Firm*—Charles W. Stewart

(57) ABSTRACT

A process for the recovery of sulfur from an acid gas stream is disclosed. The process includes a Claus sulfur recovery step in combination with a direct reduction step and a biological sulfur recovery step to provide a sweet gas stream having a very low concentration of hydrogen sulfide and sulfur dioxide. The process includes reacting an acid gas steam with oxygen under such oxidation conditions to yield a combustion gas comprising hydrogen sulfide and sulfur dioxide. The combustion gas is reacted under Claus reaction conditions to yield a reaction gas comprising sulfur. Sulfur is recovered from the reaction gas to yield a Claus tail gas comprising hydrogen sulfide and sulfur dioxide. The Claus tail gas is reacted under direct reduction reaction conditions to yield a direct reduction gas comprising sulfur. Sulfur is recovered from the direct reduction reaction gas to yield a tail gas comprising a concentration of hydrogen sulfide. The direct reduction tail gas is contacted with a lean absorbent to thereby remove from the tail gas a portion of the hydrogen sulfide contained therein and to yield a sweet gas and a rich solvent comprising dissolved hydrogen sulfide. The dissolved hydrogen sulfide of the rich solvent is biologically oxidized to elemental sulfur by contacting the rich solvent with sulfur bacteria under suitable biological oxidation conditions.

25 Claims, 3 Drawing Sheets

82
80
78
72
76
73
70
74
Q
62

PROCESS FOR THE HIGH RECOVERY EFFICIENCY OF SULFUR FROM AN ACID GAS STREAM

This application claims the benefit of U.S. Provisional Application Ser. No. 60/549,686 filed Mar. 3, 2004.

The invention relates to a process for the recovery of sulfur from an acid gas stream that comprises hydrogen sulfide. One aspect of the invention relates to a sulfur recovery process that includes both the catalytic and biological conversion of hydrogen sulfide to yield a sulfur product and a gas stream having a low concentration of hydrogen sulfide.

The removal of sulfur from process gas streams can be desirable or even necessary for a variety of reasons including, for example, the need to remove sulfur compounds from the process steams of chemical and hydrocarbon processing plants in order to comply with government regulations.

One well-known method that is used to treat certain process streams that contain hydrogen sulfide to recover elemental sulfur is the Claus process. The Claus process is a two-step process that includes a thermal step followed by a catalytic step. In the thermal step, the hydrogen sulfide of a feed stream is partially oxidized by combustion with oxygen to form a combustion gas containing sulfur dioxide. The chemical reaction of the thermal step is represented by the following equation (1):

$$2H_2S+3O_2\rightarrow 2SO_2+2H_2O \quad (1)$$

The unreacted hydrogen sulfide and the formed sulfur dioxide contained in the combustion gas can undergo the Claus reaction whereby they are reacted to form elemental sulfur in accordance with the following equation (2):

$$2H_2S+SO_2\leftrightarrows 3S+2H_2O \quad (2)$$

Further in the Claus process, unreacted hydrogen sulfide and sulfur dioxide in the combustion gas are catalytically reacted in accordance with the Claus reaction equation (2) by passing the combustion gas over a Claus catalyst which provides for a lower Claus reaction temperature. The Claus process also provides for the recovery of the formed elemental sulfur as a product and for the yielding of a Claus tail gas.

While the Claus process is very effective at providing for the recovery of a major portion of the sulfur in its feed stream, it still only provides for up to about 94 to 96 percent sulfur recovery with a two-bed catalytic Claus plant. Claus plants with three or more catalytic beds can provide for incremental improvements in sulfur recoveries, but the practical upper limit of sulfur recovery with a Claus plant alone is upwardly to about 97 to 98 percent. The tail gas from a Claus process, however, can further be treated so as to provide for the conversion of the residual hydrogen sulfide and sulfur dioxide and the recovery of additional sulfur. With Claus tail gas treatment, e.g. the SCOT Process, the overall sulfur recovery can approach upwardly to about 99 to 99.8 percent.

There is an ongoing need for improved sulfur recovery processes that provide for high sulfur recovery and better operating efficiencies preferably with lower capital costs. With increasingly more stringent sulfur emission standards, there is also a need for sulfur recovery processes that provide for even greater sulfur recoveries from process streams containing sulfur compounds than are provided by conventional sulfur recovery systems that include a Claus unit coupled with a Claus tail gas treatment unit.

It is thus an object of the inventive process to provide for a high sulfur recovery from a process stream containing a sulfur compound.

Another object of the invention is to provide a process for efficiently recovering sulfur from a process steam containing a sulfur compound.

Accordingly, one embodiment of the invention is a process comprising subjecting a gas stream comprising a concentration of $H_2S$ and a concentration of $SO_2$ to a direct reduction step to yield a direct reduction tail gas and biologically treating the direct reduction tail gas to yield a sweet gas and a sulfur product.

Another embodiment of the invention includes a sulfur recovery process that comprises passing a Claus tail gas comprising $H_2S$ and $SO_2$ to a direct reduction reaction zone operated under direct reduction reaction conditions and yielding a direct reduction tail gas comprising $H_2S$. The direct reduction tail gas is passed to a biological gas desulfurization system operated to yield a sulfur product and a sweet gas.

Yet another embodiment of the invention includes a sulfur recovery process in which an acid gas stream comprising hydrogen sulfide is charged as a feed to a Claus sulfur recovery system operated so as to yield a first sulfur product and a Claus tail gas comprising hydrogen sulfide. The Claus tail gas is passed to a direct reduction reaction zone operated under direct reduction reaction conditions so as to yield a direct reduction reaction gas comprising sulfur. Sulfur is recovered from the direct reduction reaction gas to yield a direct reduction tail gas comprising a concentration of hydrogen sulfide. The direct reduction tail gas is then charged to a biological gas desulfurization system operated to yield a second sulfur product and a sweet gas comprising less than 100 ppmv hydrogen sulfide.

In still another embodiment of the invention a process is provided which includes subjecting the tail gas of a Claus sulfur recovery step to a direct reduction step followed by biological sulfur recovery step to provide a sweet gas stream having a very low concentration of hydrogen sulfide and sulfur dioxide. The acid gas steam is reacted with oxygen under such oxidation conditions to yield a combustion gas comprising hydrogen sulfide and sulfur dioxide. The combustion gas is reacted under Claus reaction conditions to yield a reaction gas comprising sulfur. Sulfur is recovered from the reaction gas to yield a sulfur product and a Claus tail gas comprising hydrogen sulfide and sulfur dioxide. The Claus tail gas is reacted under direct reduction reaction conditions to yield a direct reduction reaction gas comprising sulfur. Sulfur is recovered from the direct reduction reaction gas to yield a direct reduction tail gas comprising $H_2S$. The direct reduction tail gas is contacted with a lean absorbent to thereby remove from the direct reduction tail gas a portion of the hydrogen sulfide contained therein and to yield a sweet gas and a rich solvent comprising dissolved hydrogen sulfide. The rich solvent undergoes a biological oxidation step in which the rich solvent is contacted with oxygen in a bioreaction zone and under biological oxidation conditions whereby sulfur bacteria biologically oxidizes the dissolved hydrogen sulfide of the rich solvent to elemental sulfur.

Other objects, advantages and embodiments of the invention will become apparent from the following detailed description and appended claims.

Figure 1:
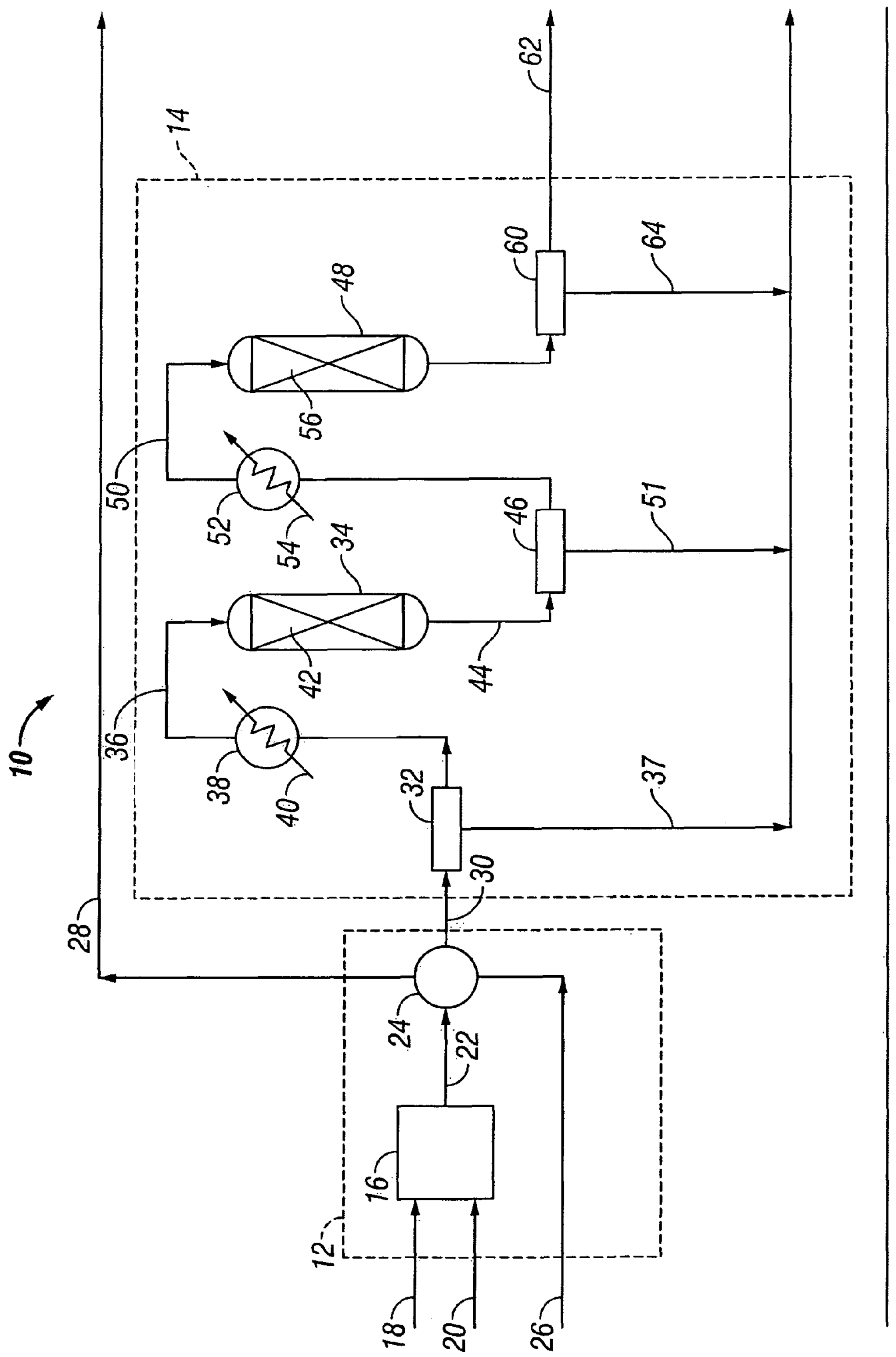
FIG. 1 is a schematic diagram representing certain aspects of the Claus process system and Claus process step of the inventive sulfur recovery process.

The inventive process provides for the high recovery efficiency of sulfur from an acid gas stream, and, thus, for the deep hydrogen sulfide removal from a gas stream containing hydrogen sulfide. A broad embodiment of the inventive process includes the treatment of a gas stream comprising a concentration of $H_2S$ and $SO_2$ by a direct reduction step to yield a direct reduction tail gas and subjecting the direct reduction tail gas to a biological gas desulfurization step to yield a sweet gas and a sulfur product. The gas stream to be subjected to the direct reduction treatment step may be a Claus tail gas. Thus, one feature of the inventive process includes arranging a sulfur recovery process system in combination with a direct reduction process system and a biological gas desulfurization process system. This arrangement provides for the processing of an acid gas stream and for the high recovery efficiency of sulfur from the acid gas stream thereby providing for a sulfur product and a sweet gas product stream having extremely low concentrations of hydrogen sulfide and sulfur dioxide.

The sulfur recovery process of the invention includes charging an acid gas stream that comprises hydrogen sulfide ($H_2S$) to a Claus sulfur recovery system. The Claus sulfur recovery system can be any suitable process system for processing an acid gas stream to yield a sulfur product and a Claus tail gas having a concentration of $H_2S$ and a concentration of $SO_2$. The Claus sulfur recovery process is a known process for the recovery of sulfur from acid gas streams, and it can provide for reasonably high sulfur recoveries. But, in cases where extremely high sulfur recoveries are desired or required, a Claus sulfur recovery process or system will not economically provide such a high recovery. Thus, in accordance with the invention, the Claus system is coupled with a biological gas desulfurization system, which processes the Claus tail gas, to provide for additional incremental sulfur removal from the Claus tail gas so as to provide a sweet tail gas having a significantly lower concentration of $H_2S$ than that of the Claus tail gas and to provide for an enhancement of overall sulfur recovery from the acid gas stream.

The sweet tail gas from the biological gas desulfurization system, thus, can have a concentration of $H_2S$ that is less than, preferably, significantly less than, the concentration of $H_2S$ of the Claus tail gas. The inventive process, therefore, provides for a particularly deep removal of $H_2S$ from the acid gas by providing a sweet tail gas generally having a concentration of $H_2S$ that is less than about 2000 parts per million volume (ppmv), but it is desirable for the concentration of $H_2S$ in the sweet tail gas to be less than 100 ppmv. The inventive process can even provide for the preferred concentration of $H_2S$ in the sweet tail gas that can be as low as less than 50 ppmv and, most preferably, the $H_2S$ concentration in the sweet tail gas is less than 10 ppmv and even less than 5 ppmv or 1 ppmv. A practical lower limit for the $H_2S$ concentration in the sweet tail gas is around 100 parts per billion volume (ppb) or 10 ppb.

The Claus sulfur recovery system can include combustion means and reaction means respectively providing for the thermal step and the catalytic step of a Claus process to thereby give a Claus sulfur product and Claus tail gas. The combustion means can include a furnace equipped with burners, or any other suitable combustion device, for receiving the acid gas and an oxygen-containing gas, such as air, and for burning or combusting a portion of the $H_2S$ contained in the acid gas to sulfur dioxide ($SO_2$) in accordance with Equation (1) above. The combustion means, thus, defines a combustion or thermal zone wherein the $H_2S$ of the acid gas is partially oxidized to form a combustion gas stream, which comprises hydrogen sulfide and sulfur dioxide.

The acid gas feed to the combustion means of the Claus system can be from any source and, as the term is used herein, acid gas refers to a fluid stream that comprises $H_2S$ usually at a significant concentration level. The acid gas feed can also comprise other components, such as, for example, carbon dioxide, or nitrogen, or hydrocarbon, or ammonia, or a combination of one or more of such listed components. The composition of the acid gas feed can, however, vary depending upon its source and other factors. A common source of the acid gas is from a conventional main gas treating system used to remove hydrogen sulfide from fluid streams containing such.

The concentration of $H_2S$ of the acid gas feed can, generally, range from about 5 volume percent of the total volume of the acid gas feed stream to about 98 volume percent. Typically, however, the $H_2S$ concentration in the acid gas feed stream is in the range of from 50 volume % to 95 volume %, and, more typically, from 80 volume % to 94 volume %. The following Table 1 presents typical composition and concentration ranges for the various components of an acid gas stream.

TABLE 1

Typical Composition of Acid Gas Feed Stream to Claus Unit

| Component | Concentration Range (volume %) |
|---|---|
| Hydrogen sulfide ($H_2S$) | 5 to 98 |
| Carbon Dioxide ($CO_2$) | 1 to 90 |
| Hydrocarbons | 0.1 to 2 |
| Nitrogen ($N_2$) | 0.1 to 1 |
| Ammonia ($NH_3$) | Up to 50 |
| Other | 0.1 to 1 |

The combustion gas stream is passed to Claus reaction means that can include a Claus reactor, which contains a suitable Claus catalyst, and a sulfur condenser. The Claus reaction means defines the Claus catalytic reaction zone, containing a Claus catalyst such as activated alumina, and the sulfur-condensing zone. The Claus reaction means provides for the reaction of the $H_2S$ and $SO_2$ of the combustion gas in accordance with Equation (2) above. The Claus reaction means further provides for the recovery of the Claus sulfur product and the yielding of the Claus tail gas.

A typical Claus tail gas comprises both $H_2S$ and $SO_2$. In the standard operation of a Claus unit, it is generally desirable for the combustion gas to the Claus reaction section to have a molar ratio of $H_2S$ to $SO_2$ as close to the stoichiometric ratio of 2:1, as reflected in Equation (2), as is feasible. This will tend to maximize sulfur recovery and minimize the amount of total sulfur, in the form of $H_2S$ and $SO_2$, which passes with the Claus tail gas.

The following Table 2 presents typical composition and concentration ranges for the various components of a Claus tail gas stream for a Claus unit operated under standard operating conditions. However, the invention herein is not limited to a Claus unit that is operated under standard or generally desirable operating conditions, and, thus, the Claus tail gas of the inventive process that is to be subjected to a direct reduction treatment step can have a wide range of concentrations of $H_2S$ and $SO_2$. For instance, in the inventive process the concentration of $H_2S$ in the Claus tail gas can be in the range of from 0.1 volume percent to 3 volume percent, with the volume percent being based on the total volume of the Claus tail gas, and the concentration of $SO_2$ can be in the range of from 0.05 volume percent (500 ppmv) to 1 volume percent, with the volume percent being based on the total volume of the Claus tail gas. More typically, the Claus tail gas can have an $SO_2$ concentration in the range exceeding 0.08 volume % (800 ppmv) to 1 volume %, and, most typically, the $SO_2$ concentration is in the range exceeding 0.1 volume % (1000 ppmv) to 0.5 volume %. As for the $H_2S$ concentration of the Claus tail gas, it can more typically be in the range of from 0.15 volume % to 2.5 volume %, and, most typically, from 0.2 volume % to 2 volume %.

TABLE 2

Typical Composition of Claus Tail Gas For Conventional Claus Unit Operation

| Component | Concentration Range (volume %) |
| --- | --- |
| Hydrogen Sulfide ($H_2S$) | 0.2 (2,000 ppmv) to 2 (20,000 ppmv) |
| Sulfur Dioxide ($SO_2$) | 0.1 (1,000 ppmv) to 0.5 (5,000 ppmv) |
| Carbon Monoxide (CO) | 0.5 to 2 |
| Hydrogen ($H_2$) | 1 to 3 |
| Nitrogen ($N_2$) | 20 to 80 |
| Carbon Dioxide ($CO_2$) | 20 to 80 |
| Water ($H_2O$) | 10 to 35 |
| Argon (Ar) | 0.5 to 1 |
| Other Sulfur Compounds | 0.12 to 1.2 |

The inventive process can include charging an $SO_2$-containing gas stream, having the concentrations of $SO_2$ and $H_2S$ as described above for the Claus tail gas and, thus, comprising a concentration of $SO_2$ and a concentration of $H_2S$, to a direct reduction system for the direct conversion of $SO_2$ contained in the $SO_2$-containing gas stream to elemental sulfur and, optionally, for the removal of elemental sulfur from the resulting direct reduction reaction gas, to yield a direct reduction tail gas that has a concentration of $SO_2$ that is less than, preferably, significantly less than, the concentration of $SO_2$ in the $SO_2$-containing gas stream. The $SO_2$-containing gas stream can be any gas stream that contains $SO_2$ and $H_2S$, including, for example, a Claus tail gas. The direct reduction system can be any suitable process system that provides for the direct reduction of $SO_2$ contained in a gas stream, having a concentration of $SO_2$ and a concentration of $H_2S$, to elemental sulfur, and it can further include sulfur recovery means for recovering sulfur from the direct reduction gas that contains the elemental sulfur resulting from the reduction of the $SO_2$.

In a preferred embodiment of the invention, the direct reduction system includes a direct reduction reactor and, optionally, a sulfur recovery unit. The direct reduction reactor defines a direct reduction reaction zone, containing a direct reduction catalyst, and provides direct reduction reaction means for contacting the $SO_2$-containing gas stream with a direct reduction catalyst under suitable direct reduction reaction conditions to directly convert at least a portion of the $SO_2$ of the $SO_2$-containing gas stream, typically by reduction with hydrogen or carbon monoxide, to elemental sulfur and to yield either a direct reduction reaction gas or a direct reduction tail gas, or, depending upon whether sulfur is recovered from the direct reduction reaction gas or not, both a direct reduction reaction gas and a direct reduction tail gas, both of which have a concentration of $SO_2$ below the concentration of $SO_2$ of the $SO_2$-containing gas stream.

As used herein, the term "direct reduction tail gas" refers either to the direct reduction gas yielded from the direct reduction reactor of the inventive process and which comprises $H_2S$, elemental sulfur, and an $SO_2$ concentration that is less than the concentration of $SO_2$ of the $SO_2$-containing gas stream, or to the direct reduction tail gas resulting form the recovery or removal of at least a portion of the elemental sulfur contained in the direct reduction gas yielded from the direct reduction reactor. In the inventive process, the direct reduction tail gas is charged to the biological gas desulfurization system for recovery of sulfur therefrom.

The direct reduction tail gas, as mentioned above, has a concentration of $SO_2$ that is less than the concentration of $SO_2$ of the $SO_2$-containing gas stream; but, to realize the maximum benefit from the inventive process, it is desirable to minimize the $SO_2$ concentration of the direct reduction tail gas, and, thus, it can be in the range of less than 0.1 volume percent (1000 ppmv) with the volume percent being based on the total volume of the direct reduction tail gas. More specifically, the $SO_2$ concentration of the direct reduction tail gas is less than 800 ppmv. It is preferred, however, for the $SO_2$ concentration of the direct reduction tail gas to be less than 500 ppmv, and, most preferred, the $SO_2$ concentration is less than 250 ppmv or even less than 100 ppmv.

The direct reduction catalyst used in the direct reduction system is any suitable composition that can provide for the direct catalytic conversion of $SO_2$ contained within an $SO_2$-containing gas stream to elemental sulfur. Examples of possible suitable compositions for use as the direct reduction catalyst of the invention include those carbonaceous or carbon-containing materials, for example, charcoal, the coals such as anthracite, and coke, as disclosed in U.S. Pat. No. 4,428,921 and U.S. Pat. No. 4,452,772, both of which are incorporated herein by reference, and the catalysts as are disclosed in U.S. Pat. No. 6,297,189 B1, which is incorporated herein by reference. The direct reduction catalyst can include such catalyst compositions as bauxite-bentonite catalyst, $NiO/Al_2O_3$ catalyst, $Co_3O_4/Al_2O_3$ catalyst, mixed oxide catalysts, including alumina supported metal oxide catalysts in which the metal oxide is selected from oxides of the metals of chromium, molybdenum, copper, cobalt, and nickel, and the sulfidized metal oxide catalysts all as disclosed in the aforementioned U.S. Pat. No. 6,297,189 B1.

One particularly preferable catalyst composition for use as the direct reduction catalyst includes a catalyst composition prepared by the impregnation of a substrate with a solution of a metallic compound followed by sulfidation of the metal impregnated substrate to convert the oxide form of the metallic compound to the sulfide form. The substrate can be an alumina substrate of any type of alumina including, for example, $\alpha$-alumina, $\beta$-alumina or $\gamma$-alumina. The impregnation solution of metallic compound is, in general, a solution of the appropriate metal salt or metal salts which will make up the final desired catalyst formulation. The metal salts can be in the nitrate form or, the less preferred form can be metal carbonates or nitrites. The direct reduction catalyst can, thus, be a sulfidized, metal impregnated alumina substrate. The thus-prepared catalyst composition may be used as the direct reduction catalyst.

The specific methods of preparing the preferred direct reduction catalyst and the specific compositions are described in detail in the aforementioned U.S. Pat. No. 6,297,189 B1. For instance, the direct reduction catalyst can comprise a mixture of sulfided metals selected from the group consisting of Group VIII metals and non-Group VIII metals. The Group VIII metals can be selected from the group consisting of iron (Fe), cobalt (Co) and nickel (Ni), and the non-Group VIII metals can be selected from the group consisting of molybdenum (Mo), manganese (Mn), copper (Cu), tungsten (W), vanadium (V), and chromium (Cr). The direct reduction catalyst can also include a compound having the following formula:

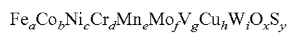

$$Fe_aCo_bNi_cCr_dMn_eMo_fV_gCu_hW_iO_xS_y$$

wherein a, b, c, d, e and f each are independently an integer (including zero) in the range of from 0 to 30;

g and h each are independently an integer (including zero) in the range of from 0 to 10;

i is an integer (including zero) in the range of from 0 to 5;

at least one of a, b, c is not 0, and at least one of d, e, f, g, h, and i is not 0; and x+y is determined by the charge balance of the formula.

The direct reduction reaction conditions under which the $SO_2$-containing gas stream is contacted with the direct reduction catalyst may be any suitable process conditions that provide for the conversion of at least a portion of the $SO_2$ to elemental sulfur; but, it is understood that, suitable process conditions will vary widely depending upon the particular direct reduction catalyst that is used. Thus, the direct reduction reaction temperature can be in the range from about 200° C. to 1000° C., the direct reduction reaction pressure can be in the range of from atmospheric upwardly to 1000 psig, and the gaseous hourly space velocity (at standard conditions) can be in the range upwardly to 20,000 $hr^{-1}$.

The direct reduction step is conducted by introducing the $SO_2$-containing gas stream to the direct reduction reaction zone and contacting it with the direct reduction catalyst under suitable direct reduction reaction conditions. A reducing gas may be added to or introduced along with the $SO_2$-containing gas stream introduced into the direct reduction reaction zone so as to provide the necessary reactant for facilitating the reduction and conversion of the $SO_2$ to elemental sulfur. In the case where the $SO_2$-containing gas stream is a Claus tail gas, the amounts of hydrogen and carbon monoxide that are typically contained in a Claus tail gas should be sufficient to provide the necessary reducing compounds to permit the $SO_2$ reduction reaction to occur. Therefore, in the preferred embodiment of the invention, no additional reducing components are added to the Claus tail gas that is subjected to the direct reduction step.

The direct reduction tail gas is charged to a biological gas desulfurization system that provides a process step for the removal of $H_2S$ from a direct reduction tail gas to yield a sweet tail gas and for the conversion of the removed $H_2S$ to yield a bioreactor sulfur product. The biological gas desulfurization system can be any suitable process system providing for a biological method for the processing of a fluid stream containing a concentration of $H_2S$ to remove therefrom the $H_2S$ and to yield the bioreactor sulfur product. An example of one such suitable biological gas desulfurization process is the Shell-Paques Process for the recovery of sulfur from fluid streams containing $H_2S$.

In a preferred embodiment of the invention, the biological gas desulfurization system comprises an arraignment of absorber means, bioreactor means and sulfur recovery means that in combination provide for the removal of $H_2S$ from the direct reduction tail gas and the conversion thereof to yield an elemental sulfur product and a sweet tail gas having a very low concentration of sulfur, such as, ultra low concentrations of $H_2S$ and $SO_2$. The absorber means of the biological gas desulfurization system can include, for example, a contacting vessel, such as an absorber, or any other suitable contacting device, that defines a contacting or an absorption zone wherein the direct reduction tail gas is contacted with a lean solvent to yield the sweet tail gas and a rich solvent containing dissolved hydrogen sulfide.

The lean solvent of the biological gas desulfurization system can include any solvent that suitably provides for the scrubbing of $H_2S$ from the direct reduction tail gas preferably by the provision of hydroxide ions that can react with the $H_2S$ of the direct reduction tail gas to form sulfide ions that become dissolved in the resulting rich solvent. Thus, the lean solvent can be an alkaline solution such as a solution, comprising sodium hydroxide or potassium hydroxide, or a mixture of both, that is preferably an aqueous solution. Thus, the alkaline solution can comprise an aqueous solution of either sodium hydroxide or potassium hydroxide, or both. It is desirable for the lean solvent to be a buffered alkaline solution of sodium hydroxide, or caustic, and for the lean solvent to have a pH exceeding 7, such as being in the range of from above 7 to 14. Preferably, the pH of the lean solvent is in the range of from about 7.5 to about 12, and, most preferably, from 8 to 10. Buffering compounds can include carbonates, bicarbonates, phosphates and mixtures of any two or more thereof. Preferably, sodium carbonate or sodium bicarbonate or a combination of both is the buffering agent.

The lean solvent is contacted with the direct reduction tail gas under such suitable absorption conditions as to provide the sweet tail gas and the rich solvent. The rich solvent is then passed to bioreactor means that defines a bioreaction zone and provides means for biologically oxidizing the dissolved hydrogen sulfide contained in the rich solvent to elemental sulfur. The bioreaction zone is operated under suitable biological oxidation conditions in the presence of oxygen so that sulfur bacteria contained therein converts the sulfide contained in the rich solvent to form elemental sulfur and hydroxide ions thereby providing for the regeneration of the rich solvent to yield the lean solvent. As a result of this biological oxidation, the lean solvent can contain elemental sulfur generally in the form of sulfur particles.

Any sulfur bacteria that suitably provides for the conversion of the dissolved hydrogen sulfide contained in the rich solvent to elemental sulfur can be used in the bioreaction zone. Possible species and strains of sulfur bacteria may be selected from those classified within the genera of *Beggiatoa*, *Thiothrix*, and *Thiobacillus*. The source of the sulfur bacteria is not important, and any suitable sulfur bacteria may be used to biologically oxidize the $H_2S$ of the rich solvent; provided, that, the sulfur bacteria used performs the above noted desired function of $H_2S$ conversion to elemental sulfur. Many of the suitable species of sulfur bacteria are naturally occurring and can be found in environments, including industrial and natural environments, where sulfur or sulfur compounds are present, such as in hot sulfur springs and their surrounding environment. The preferred genus from which the specie of sulfur bacteria for use in the bioreactor of the invention is selected is *Thiobacillus*.

To recover the sulfur formed in the bioreaction step, a portion of the lean solvent containing sulfur is passed to sulfur recovery means for recovering sulfur from the portion of lean solvent and to yield a second sulfur product, i.e. a bioreactor sulfur product, and a sulfur reduced lean solvent. One method of recovering the sulfur particles from the lean solvent includes passing it to sulfur settler means. The sulfur settler means can include a vessel, such as a sulfur settler, which defines a settling zone. The settling zone provides for a residence time for the lean solvent that allows the sulfur particles therein to settle. Thus, sulfur settler means provides for the separation of sulfur particles contained in the lean solvent thereby forming a slurry comprising sulfur particles. The sulfur particles of the slurry can then be separated by any suitable known method, such as, for example, centrifugal and decanting methods, to provide a bioreaction sulfur product and a sulfur reduced lean solvent, having a concentration of elemental sulfur below that of the lean solvent, that can be returned to the bioreactor means.

An important feature of the inventive process is in its operation in such a manner as to minimize the amount of $SO_2$ that is contained in the gaseous feed charged to the biological desulfurization system. It is generally undesirable for the gaseous feed that is introduced into the absorber of the biological gas desulfurization system to contain a significant concentration of $SO_2$ due to its reaction with the caustic of the lean solvent. In fact, there is a direct relationship between the $SO_2$ concentration of the gaseous feed that is contacted with the caustic of the lean solvent and caustic consumption. Therefore, to lower caustic consumption in the operation of the biological desulfurization step, and, thus, operating cost, the $SO_2$ concentration in the Claus tail gas should be lowered prior to its processing by the biological desulfurization system. Another problem caused by the presence of an excessive concentration of $SO_2$ is that it tends to lower, and even significantly lower, the pH of the solvent. This reduction in the solvent pH can impact in a negative way the $H_2S$ removal efficiency of the biological desulfurization system.

The inventive process, thus, includes the treatment of the Claus tail gas by the direct reduction step to provide a direct reduction tail gas having a concentration of $SO_2$ that is less than the typical $SO_2$ concentrations found in the Claus tail gas streams of Claus units. Thus, generally, the concentration of $SO_2$ of the direct reduction tail gas of the inventive process is, in general, less than 1,000 ppmv. But, as noted above, it is a most desirable aspect of the inventive process for the concentration of $SO_2$ in the direct reduction tail gas to be minimized, and, thus, it can be less than about 500 ppmv and even less than 300 ppmv. Preferably, the $SO_2$ concentration of the direct reduction tail gas of the inventive process is less than 100 ppmv, and, most preferably, less than 50 ppmv. A practical lower limit for the $SO_2$ concentration is around 100 ppb or 10 ppb.

Now, presented in FIG. 1 is a schematic diagram representing the Claus sulfur recovery step 10 of the inventive process. The Claus sulfur recovery step includes a thermal or combustion step 12 and a catalytic step 14. An acid gas stream and an oxygen-containing gas stream are introduced into furnace 16, respectively, through lines 18 and 20. Furnace 16 provides for the partial combustion of the $H_2S$ of the acid gas stream to form $SO_2$. The resulting combustion gas stream passes from furnace 16 through line 22 to heat exchanger 24 whereby it is cooled by the indirect exchange of heat with water. The water is supplied to heat exchanger 24 through line 26 and steam passes from heat exchanger 24 through line 28.

The cooled combustion gas stream from heat exchanger 24 passes to catalytic step 14 of Claus sulfur recovery step 10 through line 30. The catalytic step 14 further includes passing the cooled combustion gas stream by way of line 30 to first sulfur condenser 32. First sulfur condenser 32 defines a condensation zone and provides means for condensing and separating liquid sulfur from the cooled combustion gas stream to thereby provide a first Claus reactor feed stream that is charged to first Claus reactor 34 by way of line 36. The separated liquid sulfur passes from first sulfur condenser 32 by way of line 37. Line 36 is in fluid flow communication with first sulfur condenser 32 and first Claus reactor 34 and interposed therein is first reheater 38, which defines a heat exchange zone and provides means for heating the first Claus reactor feed stream prior to charging it as a feed to first Claus reactor 34. Generally, steam is a suitable heat source and passes to first reheater 38 through line 40.

The first Claus reactor 34 defines a reaction zone that contains a catalyst bed 42 of a Claus catalyst, such as activated alumina. The first Claus reaction zone defined by first Claus reactor 34 is operated so as to provide for the contacting of the first Claus reactor feed stream with the Claus catalyst contained within the first Claus reaction zone under suitable Claus reaction conditions. A first Claus reactor effluent passes from first Claus reactor 34 through line 44 to second sulfur condenser 46. Second sulfur condenser 46 defines a condensation zone and provides means for condensing and separating liquid sulfur from the first Claus reactor effluent to thereby provide a second Claus reactor feed stream that is charged to second Claus reactor 48 by way of line 50. The separated liquid sulfur passes from second sulfur condenser 46 by way of line 51. Interposed in line 50 is second reheater 52, which defines a heat exchange zone and provides means for heating the second Claus reactor feed stream prior to charging it as a feed to second Claus reactor 48. Generally, steam is a suitable heat source and passes to second reheater 52 through line 54.

The second Claus reactor 48 defines a second Claus reaction zone that contains a catalyst bed 56 of a Claus catalyst, such as activated alumina. The second Claus reaction zone defined by second Claus reactor 48 is operated so as to provide for the contacting of the second Claus reactor feed stream with the Claus catalyst contained within the second Claus reaction zone under suitable Claus reaction conditions. A second Claus reactor effluent passes from second Claus reactor 48 through line 58 to third sulfur condenser 60. Third sulfur condenser 60 defines a condensation zone and provides means for condensing and separating liquid sulfur from the second Claus reactor effluent to thereby provide a Claus tail gas stream that is charged to the direct reduction sulfur recovery step, not shown in FIG. 1 but shown in FIG. 2, by way of line 62. The separated liquid sulfur passes from third sulfur condenser 60 by way of line 64.

It is noted that the description herein of the Claus catalytic step 14 is with respect to two catalytic reaction steps that are arranged in series. But, it is understood that whether or not a Claus catalytic step is even used, or the exact number of Claus catalytic stages used, in the inventive process will depend upon the acid gas feed composition and other economic considerations. Therefore, references herein to the Claus process can mean a sulfur recovery process that includes a thermal step followed by a Claus reaction step in which elemental sulfur is formed by way of the Claus reaction as represented by equation (2) above either without the use of a Claus catalyst or with the use of a Claus catalyst and with the Claus reaction step being conducted in one or more reaction stages.

The liquid sulfur passing through lines 37, 51 and 64 pass from Claus sulfur recovery step 10 through line 66 as the first sulfur product of the inventive process.

Figure 2:
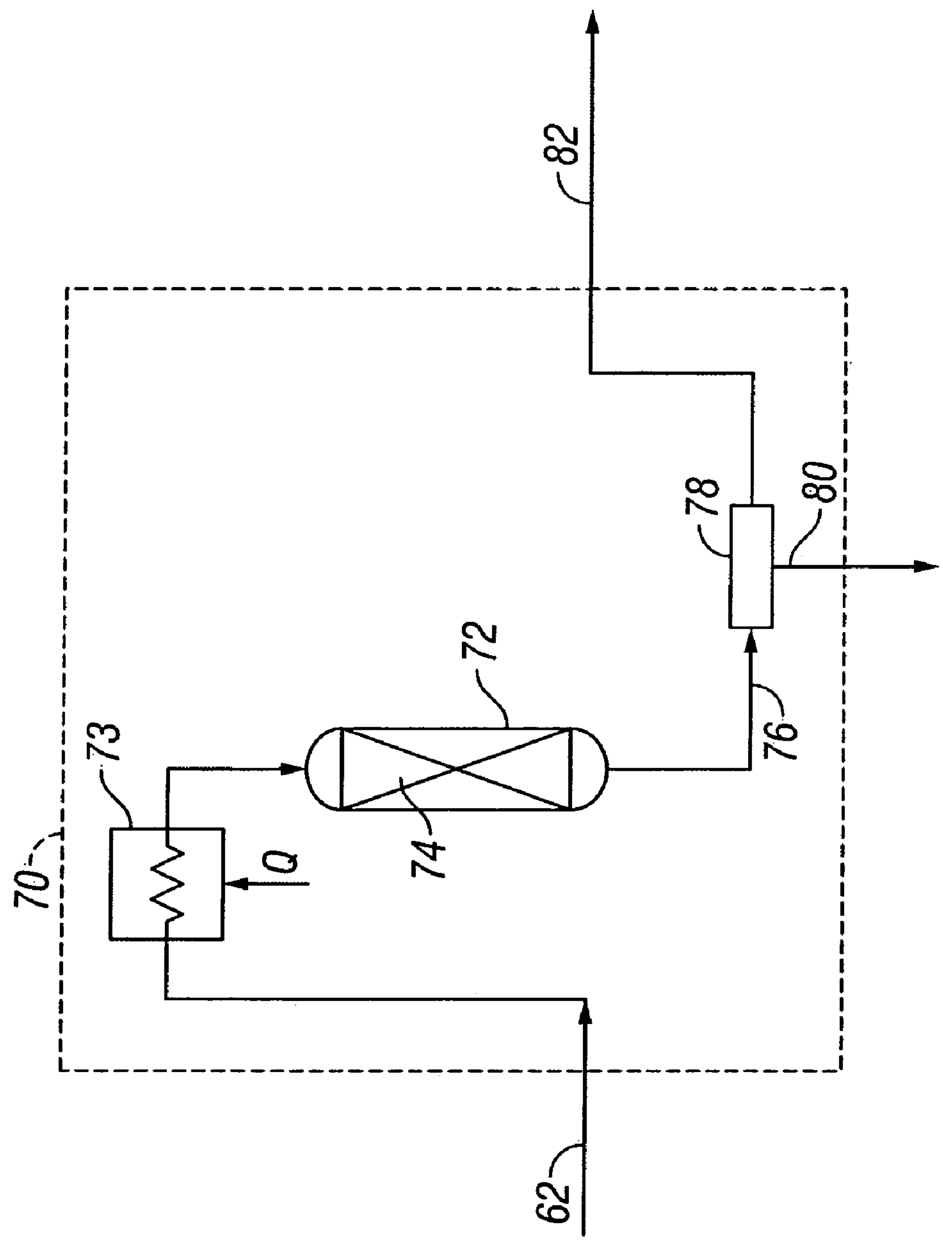
FIG. 2 is a schematic diagram representing certain aspects of the direct reduction system and process step of the inventive sulfur recovery process.

Presented in FIG. 2 is a schematic diagram representing the direct reduction step 70 of the inventive process. The Claus tail gas passes from Claus sulfur recovery step 10 through line 62 and is introduced into direct reduction reactor 72. Interposed in line 62 is heater 73 that defines a heating zone for transferring heat energy, Q, to the Claus tail gas prior to its introduction into direct reduction reactor 72. Direct reduction reactor 72 defines a direct reduction reaction zone that contains a catalyst bed 74 of direct reduction catalyst, such as described above, and direct reduction reactor 72 provides means for contacting the Claus tail gas with the direct reduction catalyst. The direct reduction reaction zone is operated so as to provide for the contacting of the Claus tail gas with the direct reduction catalyst within the direct reduction zone under suitable direct reduction reaction conditions.

Yielded from direct reduction reactor 72 is a direct reduction gas, comprising sulfur, which passes from reactor 72 by way of line 76 to sulfur condenser 78. Sulfur condenser 78 defines a sulfur recovery zone and provides means for removing or recovering sulfur from the direct reduction gas to thereby yield a direct reduction tail gas that comprises $H_2S$ but which has a concentration of $SO_2$ that is less than the concentration of $SO_2$ of the Claus tail gas. The recovered sulfur passes from sulfur recovery unit 78 by way of line 80 and the direct reduction tail gas passes from sulfur recovery unit 78 and, thus, the direct reduction step 70 through line 82 to biological sulfur recovery step 100 as presented in FIG. 3.

Figure 3:
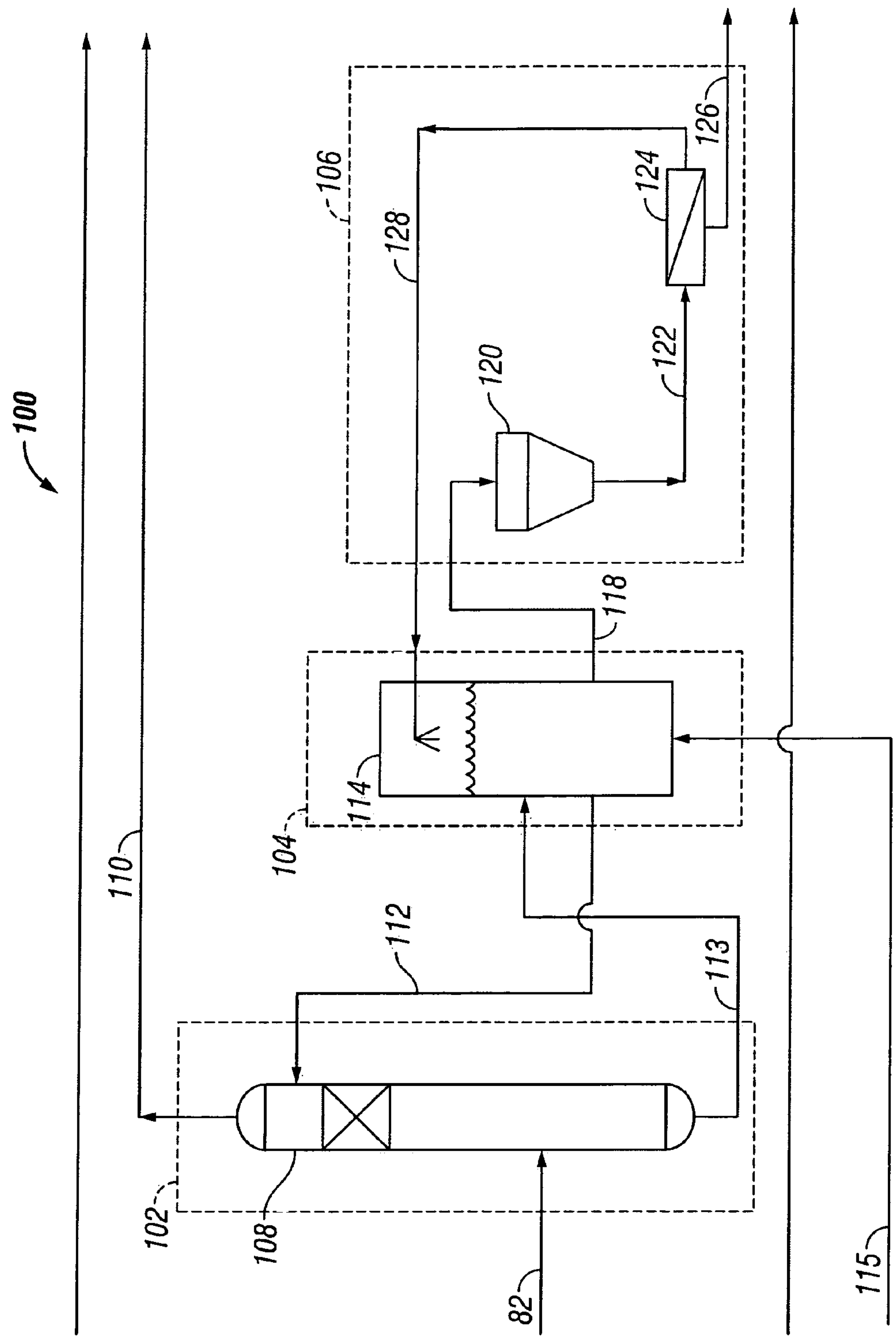
FIG. 3 is a schematic diagram representing certain aspects of the biological gas desulfurization system and biological conversion process step of the inventive sulfur recovery process.

Presented in FIG. 3 is a schematic diagram representing the biological sulfur recovery step 100 of the inventive process. The biological sulfur recovery step 100 includes absorption step 102, biological oxidation step 104 and sulfur separation step 106. The direct reduction tail gas stream passing from direct reduction step 70 through line 82 is passed to absorption step 102 which provides for the contacting of the direct reduction tail gas with a lean solvent under suitable absorption conditions to thereby remove $H_2S$ and even $SO_2$, if present, from the direct reduction tail gas and to yield a sweet tail gas and a rich solvent. Providing for the absorption is absorber 108. Absorber 108 defines an absorption zone and provides means for the absorption of the $H_2S$ and $SO_2$ from the direct reduction tail gas to yield the sweet tail gas and rich solvent. The sweet tail gas passes from absorber 108 through line 110.

The lean solvent is introduced into absorber 108 by way of line 112, and the direct reduction tail gas is introduced into absorber 108 by way of line 82. Within absorber 108 the lean solvent and direct reduction tail gas are contacted together, preferably in a counter-current flow arrangement. The rich solvent passes from absorber 108 through line 113 to biological oxidation step 104, which provides for the contacting of the rich solvent and oxygen. The sulfur bacteria in the solvent provides for the oxidation of the sulfide dissolved in the rich solvent to elemental sulfur. Providing for the biological oxidation is bioreactor 114. Bioreactor 114 defines a biological oxidation or reaction zone and provides means for the biological oxidation or reaction of the dissolved sulfide contained in the rich solvent to yield the lean solvent. The lean solvent, thus, can contain sulfur. Bioreactor 114 provides for the biological oxidation by contacting the rich solvent under suitable bioreaction conditions, with sulfur bacteria and oxygen. Oxygen or air is introduced into bioreactor 114 to be contacted with the rich solvent by way of line 115.

Lean solvent passes from bioreactor 114 and is charged, as noted above, as a feed to absorber 108 through line 112 while a portion of the lean solvent from bioreactor 114 passes through line 118 to sulfur separation step 106. Sulfur separation step 106 provides for the removal of sulfur from the lean solvent to yield a bioreaction sulfur product and a sulfur reduced lean solvent. The separation step 106 includes the passing of the portion of lean solvent to sulfur settling vessel 120. Settling vessel 120 defines a settling zone that provides for a residence time for the lean solvent thereby allowing for the settling of the sulfur particles therein. A slurry comprising sulfur particles is removed from settling vessel 120 and passes therefrom through line 122 to a sulfur separation means 124, such as, for example, a centrifuge or a decanter. Sulfur separation means 124 defines a separation zone and provides means for separating sulfur from the slurry to yield the bioreactor sulfur product and the sulfur reduced lean solvent. The bioreactor sulfur product passes from sulfur separation means 124 through line 126. The sulfur reduced lean solvent is recycled to bioreactor 114 through line 128.

The following example is presented to further illustrate the invention, but it is not to be construed as limiting the scope of the invention.

EXAMPLE

This Example presents a typical acid gas feed composition that is charged to a typical two-stage Claus sulfur plant and the calculated Claus tail gas composition for a base case representing the standard operation of the Claus sulfur plant, i.e. a Claus reactor feed $H_2S$ to $SO_2$ molar ratio of 2:1, and the calculated direct reduction tail gas composition for the an inventive case.

Presented in Table 3 below is a typical Claus sulfur plant acid gas feed stream, the calculated tail gas composition of the Claus sulfur plant when it is operated to obtain the typical 2:1 molar ratio of $H_2S$ to $SO_2$ in the tail gas, and the calculated composition of the direct reduction tail gas from the direct reduction treatment of the Claus tail gas.

TABLE 3

Typical Claus Sulfur Plant Feed and Tail Gas Compositions and Exemplary Tail Gas Composition for the Operation of Claus Sulfur Plant of the Inventive Process

| Component | Feed Composition | Tail Gas Comp Base Case (%) | Direct Reduction Inventive Case (%) |
|---|---|---|---|
| $H_2$ | | 2.05 | 1.0602 |
| $CH_4$ | 1.0 | | |
| $H_2O$ | 6.0 | 34.99 | 35.516 |
| CO | | 0.44 | 0.442 |
| $N_2$ | | 58.68 | 58.817 |
| $CS_2$ | | 0.01 | 0.008 |
| $H_2S$ | 85.0 | 0.50 (5000 ppmv) | 0.505 (5050 ppmv) |
| $SO_2$ | | 0.25 (2500 ppmv) | 0.025 (250 ppmv) |
| $CO_2$ | 8.0 | 2.94 | 2.950 |
| COS | | 0.02 | 0.018 |
| Elemental S | | 0.12 | 0.117 |
| Total | 100.0 | 100.0 | 100.0 |

As may be seen from the compositions presented in Table 3, with the use of the direct reduction step, the direct reduction tail gas has a significantly lower concentration of $SO_2$ and hydrogen than such concentrations in the Claus tail gas. The lower concentration of hydrogen in the direct reduction tail gas is due to the consumption of hydrogen as the reducing gas for the reduction of the $SO_2$ in the treated Claus tail gas.

With the direct reduction tail gas stream being charged to the caustic absorber of a biological sulfur recovery unit having much-reduced $SO_2$ concentration as compared to the $SO_2$ concentration of the Claus tail gas, the caustic consumption in the operation of the biological sulfur recovery unit will, therefore, also be much reduced. The reduced SO2 concentration in the tail gas to be treated in the biological sulfur recovery unit will resulting in reduced cost of its operation.

Reasonable variations, modifications and adaptations can be made within the scope of the described disclosure and the appended claims without departing from the scope of the invention.

That which is claimed is:

1. A process, comprising:

subjecting an $SO_2$-containing gas stream comprising a concentration of $H_2S$ and a concentration of $SO_2$ to a direct reduction step to yield a direct reduction tail gas;

wherein said concentration of $H_2S$ in said $SO_2$-containing gas stream is in the range of from 0.5 to 3 volume percent of said $SO_2$-containing gas stream and said concentration of $SO_2$ in said $SO_2$-containing gas stream is in the range of from 0.05 to 1 volume percent of said $SO_2$-containing gas stream, wherein said direct reduction tail gas has a concentration of $SO_2$ that is less than 1000 ppmv; and biologically treating with a sulfur bacteria selected from the group consisting of *Beggiatoa, Thiothrix* and *Thiobacillus*, said direct reduction tail gas to yield a sweet tail gas and a bioreactor sulfur product; wherein said sweet tail gas has a concentration of $H_2S$ less than 100 ppmv.

2. A process as recited in claim 1, wherein said direct reduction tail gas has a concentration of $SO_2$ that is less than said concentration of $SO_2$ in said $SO_2$-containing gas stream.

3. A process as recited in claim 1, wherein said direct reduction step includes:

contacting said $SO_2$-containing gas stream with a direct reduction catalyst within a direct reduction reaction zone operated under direct reduction reaction conditions; and yielding said direct reduction tail gas.

4. A process as recited in claim 3, wherein said direct reduction tail gas is obtained by the steps of yielding from said direct reduction reaction zone a direct reduction reaction gas, comprising $H_2S$ and elemental sulfur, and obtaining from said direct reduction reaction gas, said direct reduction tail gas that is subjected to said biological treating step.

5. A process as recited in claim 4, wherein said direct reduction step further includes removing at least a portion of said elemental sulfur from said direct reduction reaction gas to thereby provide said direct reduction tail gas, having a reduced concentration of elemental sulfur, that is subjected to said biological treating step.

6. A process as recited in claim 5, wherein said step for biologically treating said direct reduction tail gas includes:

contacting said direct reduction tail gas with a lean solvent, comprising an alkaline solution, under absorption conditions; and yielding said sweet tail gas and a rich solvent, comprising hydrogen sulfide.

7. A process as recited in claim 6, wherein said step for biologically treating said direct reduction tail gas further includes:

biologically oxidizing said hydrogen sulfide of said rich solvent to elemental sulfur by contacting said rich solvent with the sulfur bacteria under biological oxidation conditions; and yielding the sulfur product.

8. A process as recited in claim 1, wherein said sulfur bacteria includes those organisms of the genus *Thiobacillus*.

9. A sulfur recovery process, comprising:

passing a Claus tail gas comprising $H_2S$ and $S0_2$ to a direct reduction reaction zone operated under direct reduction reaction conditions, wherein the concentration of $H_2S$ in said Claus tail gas is in the range of from 0.5 to 3 volume percent of said Claus tail gas and the concentration of $SO_2$ in said Claus tail gas is in the range of from 0.05 to 1 volume percent of said Claus tail gas;

yielding a direct reduction tail gas comprising $H_2S$, wherein the concentration of $SO_2$ in said direct reduction tail gas is less than 1000 ppmv; and passing said direct reduction tail gas to a biological gas desulfurization system comprising sulfur bacteria selected from the group consisting of *Beggiatoa, Thiothrix* and *Thiobacillus*, wherein the system is operated to yield a sulfur product and a sweet gas; wherein said sweet gas has a concentration of $H_2S$ of less than 100 ppmv.

10. A sulfur recovery process as recited in claim 9, wherein said direct reduction reaction zone includes a direct reduction catalyst and where within said Claus tail gas is contacted with said direct reduction catalyst and wherein yielded from said direct reduction reaction zone is a direct reduction reaction gas, comprising H2S and elemental sulfur, and obtaining from said direct reduction reaction gas, said direct reduction tail gas that is passed to said biological gas desulfurization system.

11. A sulfur recovery process as recited in claim 10, further comprising:

removing at least a portion of said elemental sulfur from said direct reduction reaction gas to thereby provide said direct reduction tail gas, having a reduced concentration of elemental sulfur, that is passed to said biological gas desulfurization system.

12. A sulfur recovery process as recited in claim 9, wherein the concentration of $SO_2$ in said direct reduction tail gas is less than the concentration of $SO_2$ in said Claus tail gas.

13. A sulfur recovery process as recited in claim 9, wherein said biological gas desulfurization system comprises:

absorber means for contacting said direct reduction tail gas with a lean solvent to yield said sweet gas and a rich solvent;

bioreactor means comprising *Thiobacillus* for biologically oxidizing the dissolved hydrogen sulfide contained in said rich solvent and to yield said lean solvent containing sulfur; and sulfur recovery means for recovering sulfur from a portion of said lean solvent and to yield a second sulfur product and a sulfur reduced lean solvent.

14. A sulfur recovery process as recited in claim 13, further comprises:

returning said sulfur reduced lean solvent to said bioreactor means.

15. A sulfur recovery process, comprising:

charging an acid gas stream comprising hydrogen sulfide as a feed to a sulfur recovery system operated so as to yield a first sulfur product and a Claus tail gas comprising hydrogen sulfide and sulfur dioxide;

passing said Claus tail gas to a direct reduction reaction zone operated under direct reduction reaction conditions to yield a direct reduction reaction gas comprising sulfur;

recovering sulfur from said direct reduction reaction gas to yield a direct reduction tail gas comprising a concentration of hydrogen sulfide; and charging said direct reduction tail gas to a biological gas desulfurization system operated to yield a second sulfur product and a sweet gas comprising less than 100 ppmv hydrogen sulfide.

16. A sulfur recovery process as recited in claim 15, wherein said biological gas desulfurization system comprises:

absorber means for contacting said direct reduction tail gas with a lean solvent to yield said sweet gas and a rich solvent;

bioreactor means for biologically oxidizing the dissolved hydrogen sulfide contained in said rich solvent and to yield said lean solvent containing sulfur; and sulfur recovery means for recovering sulfur from a portion of said lean solvent and to yield a second sulfur product and a sulfur reduced lean solvent.

17. A sulfur recovery process as recited in claim 16, further comprises:

returning said sulfur reduced lean solvent to said bioreactor means.

18. A sulfur recovery process, comprising:

passing an acid gas stream comprising hydrogen sulfide to a combustion zone defined by combustion means and providing for partially oxidizing the hydrogen sulfide in said acid gas stream with oxygen to form sulfur dioxide thereby providing a combustion gas stream comprising sulfur dioxide and hydrogen sulfide;

passing said combustion gas stream to a Claus reaction zone operated under Claus conversion conditions to yield a reaction gas comprising sulfur;

recovering sulfur from said reaction gas to yield a Claus tail gas comprising a concentration of hydrogen sulfide and a concentration of sulfur dioxide;

reacting said Claus tail gas under direct reduction reaction conditions to yield a direct reduction reaction gas comprising sulfur;

recovering sulfur from said direct reduction reaction gas to yield a direct reduction tail gas comprising a concentration of hydrogen sulfide;

passing said direct reduction tail gas to an absorption zone defined by absorber means for contacting said direct reduction tail gas with a lean caustic solution whereby hydrogen sulfide is recovered from said Claus tail gas and from which is yielded a sweet tail gas and a rich caustic solution; and passing said rich caustic solution to a bioreaction zone defined by bioreactor means for the biological oxidation of dissolved sulfide in said rich caustic solution to elemental sulfur.

19. A sulfur recovery process as recited in claim 18, further comprising:

passing a portion of said lean caustic solution to sulfur recovery means for recovering sulfur from a portion of said lean caustic solution and to yield a sulfur reduced lean caustic solution and sulfur; and returning said sulfur reduced lean caustic solution to said bioreaction zone.

20. A sulfur recovery process as recited in claim 19, wherein said sweet tail gas comprises less than 100 ppmv $H_2S$.

21. A sulfur recovery process, comprising:

reacting an acid gas steam with oxygen under such oxidation conditions to yield a combustion gas comprising hydrogen sulfide and sulfur dioxide;

reacting said combustion gas under Claus reaction conditions to yield a reaction gas comprising sulfur;

recovering sulfur from said reaction gas to yield a Claus tail gas comprising hydrogen sulfide and sulfur dioxide;

reacting said Claus tail gas under direct reduction reaction conditions to yield a direct reduction gas comprising sulfur;

recovering sulfur from said direct reduction gas to yield a direct reduction tail gas comprising $H_2S$;

contacting said direct reduction tail gas with a lean absorbent thereby removing from said direct reduction tail gas a portion of the hydrogen sulfide contained therein and to yield a sweet gas and a rich solvent comprising dissolved hydrogen sulfide; and biologically oxidizing the dissolved hydrogen sulfide of said rich solvent to elemental sulfur by contacting said rich solvent with a sulfur bacteria under suitable biological oxidation conditions.

22. A sulfur recovery process as recited in claim 21, wherein said sweet gas comprises less than 100 ppmv $H_2S$.

23. A sulfur recovery process as recited in claim 22, further comprising:

recovering said elemental sulfur.

24. A sulfur recovery process as recited in claim 23, wherein said sulfur bacteria includes those organisms of the genus *Thiobacillus*.

25. A sulfur recovery process as recited in claim 24, wherein said lean absorbent comprises a buffered alkaline solution.

* * * * *